United States Patent Office 2,891,208
Patented June 16, 1959

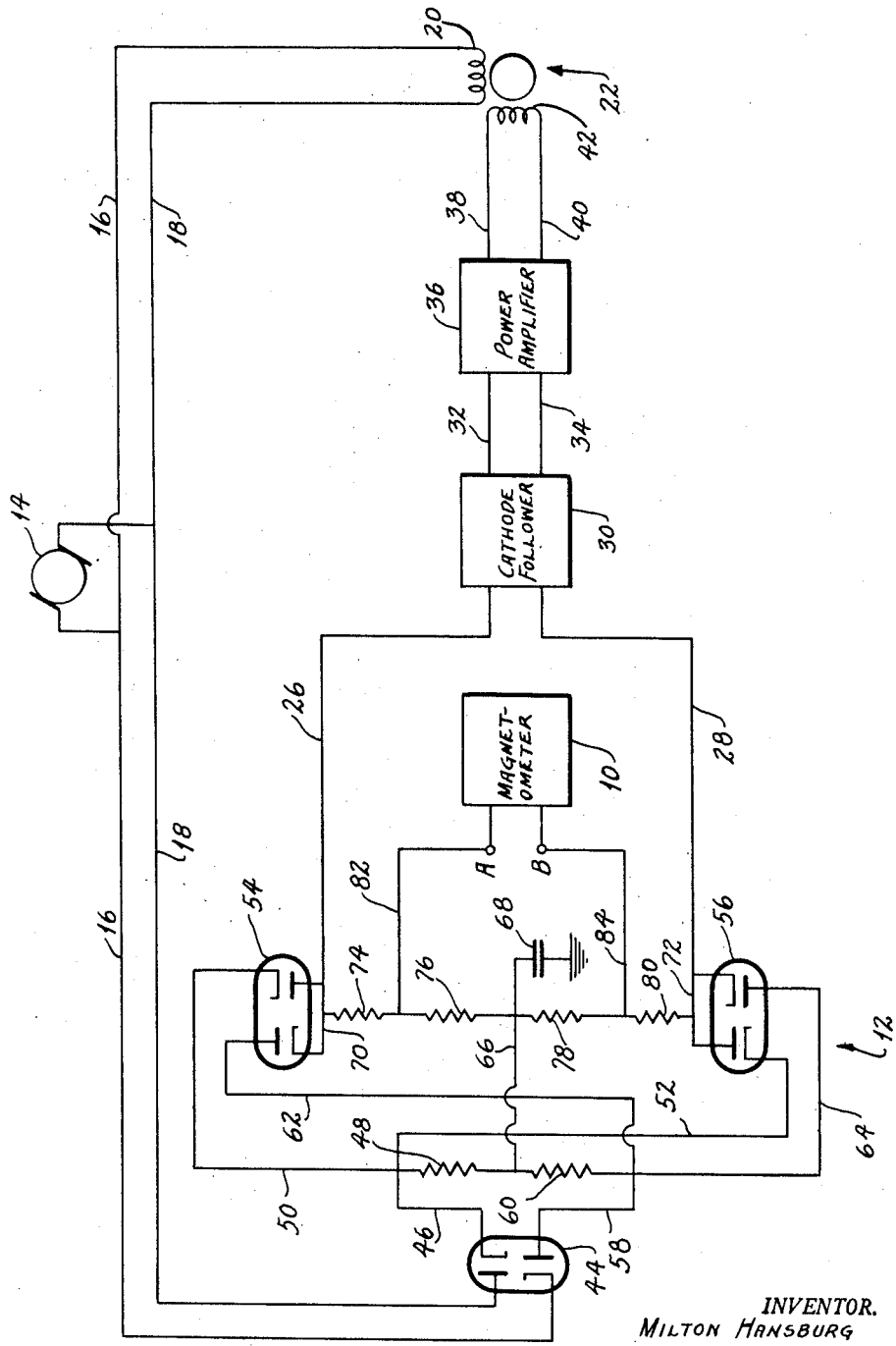

2,891,208

AUTOPILOT AND CIRCUIT FOR CONVERTING A D.C. CONTROL SIGNAL VOLTAGE TO AN A.C. CONTROL SIGNAL VOLTAGE

Milton Hansburg, Weisel, Pa.

Application June 23, 1952, Serial No. 295,143

3 Claims. (Cl. 318—489)

(Granted under Title 35, U.S. Code (1952), sec. 266)

The invention described herein may be manufactured and used by or for the Government of the United States of America for governmental purposes without the payment of any royalties thereon or therefor.

This invention relates to circuits for converting a D.C. control signal voltage characterized by varying magnitude and changing direction of current flow or polarity to an A.C. control signal voltage of varying amplitude and changing phase wherein the A.C. voltage amplitude is proportional to the D.C. voltage magnitude and the phase relationship of the A.C. control voltage with respect to the D.C. control voltage is dependent upon the direction of D.C. signal control voltage current flow.

Such a device will be found by those skilled in the art to have many uses, especially in the field of automatic remote control. As an example of the practicability of the present invention it is described herein as used in connection with an aircraft automatic pilot, whereby the D.C. output signal of the aircraft magnetometer is converted to an A.C. output signal which is utilized to control directly the phase and amplitude-responsive A.C. servomotor in the autopilot. Thus, whereas formerly a servo-mechanism having a mechanical output proportional to the magnetometer electrical output was employed to turn the rudder knob of the autopilot, the herein-disclosed converter system permits electrical connection of the magnetometer output to the input of the autopilot whereby the autopilot will yield directly a coordinated turn of the craft in accordance with the magnitude and polarity of the D.C. magnetometer signal.

The primary object of this invention is to provide an electrical system for converting a D.C. control voltage of changing magnitude and polarity into an A.C. output voltage of proportional changing amplitude and having a phase relationship dependent upon the polarity of the control voltage.

Another object is to provide a signal conversion system of the character described for converting the D.C. magnetometer output error signal of a craft control system to an A.C. error signal which can be utilized directly to operate an autopilot.

Other objects and many of the attendant advantages of this invention will readily be appreciated as the same becomes better understood by reference to the following detailed description when considered in connection with the accompanying single drawing illustrating the invention schematically.

In the drawing, the number 10 indicates a standard magnetometer, such as one that measures the absolute value of the earth's magnetic field, shown in block form, having output terminals A and B. An example of such a magnetometer is the AN/ASQ-1 type equipment employed by the U.S. Navy for the detection of submarines. As known to those versed in the art, the output signal of the magnetometer is a D.C. voltage of magnitude proportional to the departure of the craft from the pre-set course, and of polarity dependent upon whether the craft is displaced to the right of or to the left of dead on course. Thus, when the craft is dead on course, there is no signal voltage at the output terminals A and B.

The number 12 indicates the modulator portion of the circuit comprising the invention. An input A.C. reference voltage from the controlled craft A.C. generator 14 is fed to the modulator 12 through conductors 16, 18, which conductors also feed the reference voltage to one winding 20 of a two-phase motor 22 of the type used in conventional autopilots.

As hereinbelow described, the modulator 12 converts the D.C. control signal from the magnetometer 10 to an A.C. control signal, which signal is fed through output conductors 26, 28 into an isolating cathode follower circuit 30, thence, through conductors 32, 34 into a power amplifier 36, the output of which is connected by conductors 38, 40 to the other winding 42, of the two-phase motor 22 of the autopilot.

Cathode followers and power amplifiers such as indicated by the reference characters 30 and 36 are known in the electronic art, and therefore are not described herein in detail.

The A.C. reference voltage from the generator 14 is connected to a plate and cathode of the separate sections of a duo-diode 44. The remaining cathode of the duo-diode 44 is connected by wire 46 to one end of a resistor 48, and, by wires 50 and 52, respectively, to the cathode of one diode section each a pair of duo-diodes 54, 56. The remaining plate of duo-diode 44 is connected by wire 58 to one end of a resistor 60, and, by wires 62 and 64, respectively, to the plate of the remaining diode section each of the pair of duo-diodes 54, 56. The remaining terminals of the resistors 48 and 60 are connected in common by a wire 66 to one terminal of a by-pass capacitor 68, the other terminal of which is connected to ground.

The remaining plate and cathode elements of the separate sections of each of the duo-diodes 54, 56 are connected together, respectively, by wires 70 and 72, and said wires are interconnected through a voltage divider comprising the series resistors 74, 76, 78 and 80. The output terminals A and B of the magnetometer 10 are connected through wires 82 and 84 to the junction point of resistors 74 and 76 and the junction point of resistors 78 and 80, respectively.

The center-tap of the series voltage-divider resistors 74, 76, 78 and 80, comprising the common junction of resistors 76 and 78, is returned to ground through condenser 68 by connection to wire 66. The input from the magnetometer 10 to the modulator is therefore balanced with respect to the A.C. ground point, the junction between resistors 66 and 78 and the wire 66.

The output signal from the modulator 12 is derived by connection of the output conductors 26 and 28 to wires 70 and 72, respectively, and is also balanced with respect to A.C. ground.

*Operation*

Since the input reference voltage current from generator 14 flows through the duo-diode 44 only when the input plate thereof is positive with respect to the input cathode, current will flow for only one-half of the A.-C. input voltage cycle. At such times current flows from the A.-C. generator 14, through conductor 18, thence, from the input plate to its associated cathode of the duo-diode 44, through wire 46, resistors 48 and 60, wire 58, through the remaining plate of the duo-diode to its associated input cathode, through wire 16 back to the generator 14. Therefore, the common junction of wire 46 and resistor 48 is at a positive potential, and the common junction of wire 58 and resistor 60 is at a negative potential. Because the positive potential junction point of wire 46 and resistor 48 is connected to the cathodes of one section each of the duo-diodes 54, 56, by wires 50 and 52, respectively, and since the negative potential junction point of wire 58 and resistor 60 is connected to the plates of the remaining sections of each of the duo-diodes 54, 56 by wires 62 and 64, respectively, said duo-diodes will be biased to cut-off so as to prevent conduction therethrough no matter what potentials are applied to the voltage divider resistors 74, 76, 78, 80 from the output terminals A and B of the magnetometer 10 within the operating range of said magnetometer. Thus, during the half-cycle when duo-diode 44 conducts, the potentials at output terminals A and B are applied, through wire 82, resistor 74 and conductor 26, for terminal A, and wire 84, resistor 80 and conductor 28, for terminal B, to the balanced input grid circuits of the cathode follower 30.

During the half-cycle when the duo-diode 44 is not conducting, that is, when the input plate is negative with respect to the input cathode thereof, the output potential of the magnetometer 10 will be shorted through one or the other of the diode sections of each of the duo-diodes 54 and 56, and the resistors 48 and 60. Thus, if terminal A happens to be positive with respect to terminal B, current will flow through wire 82, resistor 74, wire 70, through the duo-diode 54 from plate to cathode, through wire 50, resistors 48 and 60, wire 64, through the duo-diode 56 from plate to cathode, through wire 72, resistor 80 and wire 84 to terminal B. If, on the contrary, terminal B should be positive with respect to terminal A, current will flow through wire 84, resistor 80, wire 72, through the duo-diode 56 from plate to cathode, through wire 52, resistors 48 and 60, wire 62, through the duo-diode 54 from plate to cathode, through wire 70, resistor 74 and wire 82 to terminal A. Since the resistors 48 and 60 are of much less ohmic value than the voltage divider resistors 74, 76, 78 and 80, they act substantially as a short circuit across the input conductors 26, 28 to the cathode follower 30 during the half-cycles of the A.C. reference voltage when the duo-diode 44 is non-conducting. Thus, the rectified current through the resistors 48 and 60 acts as a switch to interrupt the D.C. signals at terminals A and B, converting it to an A.C. signal on the input grids of the cathode follower 30.

The conventional push-pull cathode follower 30 and power amplifier 36 serve to smooth out the converted D.C. signal from the modulator 12 so that it approximates closely a sine wave. Since the cathode follower and power amplifier have linear operating characteristics, the amplitude of the output control voltage from the power amplifier to the autopilot will be proportional to the magnitude of the output signal of the magnetometer.

In accordance with usual practice in A.C. control voltage circuits, appropriate phase-shift networks are included in the power amplifier to bring the output voltage the desired amount out of phase with respect to the reference A.C. voltage from the generator 14. Thus, in the case illustrated, wherein a two-phase motor 22 is controlled by the output of the power amplifier 36, the phase difference desired in the field windings 20 and 42 thereof is 90 degrees.

In order that the invention can be practiced with the least amount of routine circuit design, the following values listed are given as having been found satisfactory in an operating model energized by a 400 cycle A.C. generator.

| | |
|---|---|
| Resistor 48 ohms | 2,000 |
| Resistor 60 do | 2,000 |
| Resistor 74 do | 100,000 |
| Resistor 76 do | 100,000 |
| Resistor 78 do | 100,000 |
| Resistor 80 do | 100,000 |
| Condenser 68 microfarads | 1 |

Obviously, many modifications of the present invention are possible in the light of the above teachings, and it is therefore to be understood that within the scope of the appended claims the invention can be practiced other than as specifically described.

I claim:

1. In an electric control device for a moving object provided with an autopilot, said moving object having a magnetometer for developing a D.C. error voltage representative of both the magnitude and direction of deviation of the moving object from a predetermined source, said control device including means for converting such error voltage into an A.C. signal the amplitude and phase of which are respectively indicative of the said magnitude and direction of deviation of the moving object from its predetermined course, said converting means comprising a modulator, a cathode follower circuit connected to the output of said modulator and a power amplifier connected to said cathode follower circuit, said modulator incorporating a pair of electronic switching circuits constituting a bridge network having an input and output which are balanced with respect to a reference potential, said D.C. error voltage being applied across said pair of electronic switching circuits so that the latter may selectively be rendered conductive to said error voltage regardless of its polarity, a source of A.C. gating signal, means for applying said A.C. gating signal to both said electronic switching circuits so that the latter are rendered non-conductive during a portion of each gating signal cycle thereby to permit passage of said error voltage to said cathode follower thence to said power amplifier for feeding said autopilot the converted D.C. error voltage, said electronic switching circuits being rendered conductive by said A.C. gating signal during the remaining portion of each gating signal cycle thereby to prevent passage of said error voltage to said autopilot.

2. An electronic control device according to claim 1, in which said modulator includes a shunt path for said error voltage in the output of each of said electronic switching circuits, the application of said A.C. gating signal to said switching circuits during a portion of each gating signal cycle causing said switching circuits to be closed and the shunt paths to be brought into operation to prevent application of the said error voltage to said autopilot.

3. In combination with an autopilot system for maintaining an aircraft on a predetermined course, a magnetometer capable of developing a balanced D.C. error voltage representative of both magnitude and direction of deviation of such aircraft from a predetermined course, a modulator connected to said magnetometer for accepting such D.C. error voltage, a power amplifier, cathode follower means for connecting the output of said modulator to said amplifier, an A.C. gating signal, means for applying said A.C. gating signal to said modulator to gate open the latter cyclically and thereby to pass said balanced D.C. control voltage to said power amplifier as a cyclically varying wave, said cyclically varying wave having an amplitude and phase that are functions of the magnitude and polarity, respectively, of such balanced D.C. error voltage, and means for applying the amplified cyclically varying wave from said amplifier to the correcting means of said autopilot system.

References Cited in the file of this patent

UNITED STATES PATENTS

| | | |
|---|---|---|
| 2,148,718 | Agins | Feb. 28, 1939 |
| 2,493,669 | Gray | Jan. 3, 1950 |
| 2,539,411 | Esval | Jan. 30, 1951 |
| 2,600,172 | St. John | June 10, 1952 |
| 2,614,335 | Noxon | Oct. 21, 1952 |